United States Patent

[11] 3,578,798

[72] Inventors Walter C. Lapple;
　　　　　　　Edward M. Poole, Alliance, Ohio
[21] Appl. No. 823,056
[22] Filed May 8, 1969
[45] Patented May 18, 1971
[73] Assignee The Babcock & Wilcox Company
　　　　　　　New York, N.Y.

[54] CYCLONIC FLUID BED REACTOR
　　9 Claims, 4 Drawing Figs.
[52] U.S. Cl. .................................................. 263/21
[51] Int. Cl. ........................................ F27b 15/02
[50] Field of Search ............................. 263/21 (A);
　　　　　　　　　　　　　　　　　　　　　　34/57, 57 (A)

[56] References Cited
UNITED STATES PATENTS

| | | | |
|---|---|---|---|
| 2,433,726 | 12/1947 | Angell............................ | 34/57AX |
| 2,607,666 | 8/1952 | Martin............................ | 34/57AX |
| 2,853,361 | 9/1958 | Bryk et al. .................... | 34/57AX |
| 2,985,439 | 5/1961 | Scivally et al................. | 263/21A |

Primary Examiner—Charles J. Myhre
Attorney—J. Maguire

ABSTRACT: A high capacity fluidized bed unit is formed of single or multiple stages where reaction products may be maintained out of contact with gaseous products of combustion used to provide heat for the reaction.

PATENTED MAY 18 1971

INVENTORS
Walter C. Lapple
Edward M. Poole

BY *J. Maguire*

ATTORNEY 3,578,798

INVENTOR.

BY

CYCLONIC FLUID BED REACTOR

The present invention relates to the construction and arrangement of fluidized beds and more particularly to improvements in the construction of fluidized bed apparatus.

The use of fluidized beds is well established in many fields and the equipment forms a useful tool in chemical processing. The characteristics of a fluidized bed are well known, and while there are some disadvantages to the use of this tool in the chemical industry, the advantages ordinarily greatly outweigh the disadvantages. One particular disadvantage of a fluidized bed relates to its capacity in relationship to its size. It is conventional practice to pass all of the reacting and inert gases through the fluidized bed at a low velocity. As a result, in many cases, the volume of the bed may be greatly in excess of that needed to provide the necessary retention time of the solids in the fluidized bed. The present invention is intended to drastically increase the solids-handling capacity of a fluidized bed so as to increase the ability of a small sized bed to attain a relatively high contact capacity, i.e. to minimize the size of the reactor to achieve maximum unit capacity.

In accordance with the present invention a fluidized bed construction is used whereby solid materials may be passed through the fluidized bed and recirculated to the bed at rates which are of an order of magnitude greater than those heretofore found possible. This is accomplished by providing a central tube which leads upwardly through the fluidized bed into the freeboard space above the normal level of the fluidized bed. The tube is supplied with a transport or lift fluid which is passed upwardly through the tube with a spiral or helical flow characteristic. The wall of the tube is provided with one or more passageways therethrough which are arranged tangentially with respect to the wall of the tube and communicate with the surrounding fluidized bed. With this arrangement, granular or particle-form material will be withdrawn from the fluidized bed and introduced tangentially into the central tube where the materials are entrained by the flowing fluid, lifted to the top of the tube and then discharged outwardly into the annular space surrounding the tube to separate from the fluid. Thus the material in the fluidized bed will be recycled at a high rate with increased capability for reaction or heat transfer effects in the fluidized bed, which is sized only in keeping with retention time requirements.

In another version of the invention the enclosing vessel may be formed with two or more vertically spaced and separate annular fluidized beds. The central tube will extend through both beds so that material may be recycled from the lower bed to the upper bed at a high rate and then flow from the upper bed to the lower bed at a correspondingly high rate. Under these circumstances, when the central tube is also used as a combustion chamber it is possible to completely separate reaction gases produced in the lower bed from the products of combustion produced in the tube if a high purity reaction product is desired.

Figure 1:
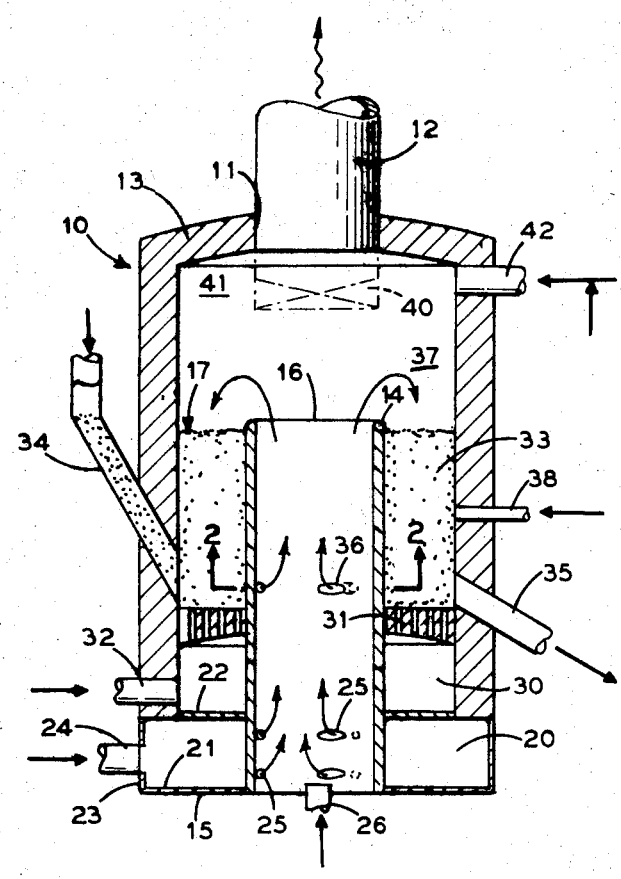
FIG. 1 is a diagrammatic elevation view, partly in section of a fluidized bed apparatus constructed and arranged in accordance with the present invention.

In the embodiment of the invention shown in FIG. 1 the fluidized bed is arranged for high production thermal treatment of a granular or particle-form material. The fluidized bed structure includes an upright vessel or shell 10 of circular, horizontal cross section largely formed of, or lined by, refractory material to withstand the elevated temperatures encountered during the thermal treatment of a solid, particle-form material. The shell 10 is provided with an upper outlet 11 and an outlet 12 centered in the top closure 13 of the shell. The shell 10 also contains an upright centrally positioned tabular sleeve 14 which extends upwardly from the bottom 15 of the vessel to a position 16 somewhat below the outlet 11. The tube 14 defines an encircling space 17 formed by the exterior boundary surface of the tube 14 and the interior surface of the shell 10.

The space 17 is divided into a plurality of adjoining superposed chambers. The lowermost chamber provides a plenum 20 for admitting combustion air and is defined by a plate 21 on the bottom 15 of the vessel, an upwardly spaced annular plate 22, the lower end portion of the tube 14 and a metallic boundary wall portion 23 of the shell 10. The plenum chamber 20 is fitted with a combustion air inlet 24 receiving air from an external source (not shown). The tube 14 is provided with vertically spaced rows of air inlets 25 tangentially arranged with respect to the inner wall of the central tube and interconnecting the plenum chamber 20 with the interior of the tube 14. Thus, air upon entering the plenum chamber, will introduced tangentially into the tube 14 to produce a spiral movement upwardly therethrough. Fuel is delivered through a port 25 and injected axially upwardly through the tube 14 into the airstreams issuing from inlets 25, so that the gases produced in the lower part of the tube 14 during the combustion process spiral upwardly and discharge from the upper end 16 of the tube.

A second plenum chamber 30 is formed in the annular space 17 upwardly adjacent the chamber 20 and is separated therefrom by the annular plate 22. A perforated annular member 31 is spaced above the plate 22 to form a roof for the chamber 30. The member 31 is shown for illustrative purposes as being formed of refractory material, but it will be understood that the member may be metallic, depending on the temperature conditions prevailing in the fluidized bed and in the chamber 30. A gaseous fluid is introduced into the chamber 30 through a pipe 32 and passed upwardly through the member 31 in sufficient quantity to fluidize the particulate or particle-form material in the upper portion of the annulus 17.

Figure 2:
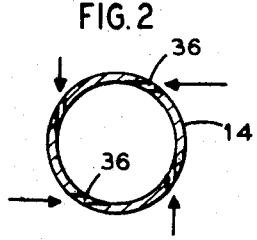
FIG. 2 is a section taken on the line 2—2 of FIG. 1.

A fluidized bed 33 is maintained in the space between the member 31 and the top 16 of the tube 14. An external downwardly inclined inlet duct 34 opens through the wall of the vessel for the introduction of solids to the fluidized bed 33 and a downwardly inclined duct 35 leads from the lower portion of the bed 33 for the removal of solids. In addition, the lower portion of the fluidized bed 33 is provided with a plurality of tangentially arranged passages 36 in the tube 14, as shown in FIGS. 1 and 2. The passages 36 discharge particle-form materials from the fluidized bed 33 into the tube 14, spiraling upwardly therethrough. As hereinafter described, the fluidized bed materials discharged into the tube 14 are entrained by the combustion gases passing upwardly therethrough and are discharged with the gases into the freeboard space 37 in the upper portion of the vessel above the upper end 16 of the tube. The vortiginous motion of the mixture of combustion gases and solids causes the solids to be discharged by outwardly centrifugal force into the upper portion of the freeboard space 37 of the vessel for reintroduction of the solids into the fluidized bed 33 by gravity.

In some circumstances it is desirable to inject additional fuel directly into the fluidized bed 33 so as to consume the oxygen in the fluidizing air that is passing upwardly through the perforated plate 31 to increase the temperature in the bed 33. Such fuel with or without combustion air may be admitted through pipe 38.

In the arrangement described, the solids entrained by the combustion gases spiraling upwardly through the tube 14 are separated in the freeboard space 37, which may be of any desired shape and dimension, with the combustion gases passing upwardly through the outlet duct 12. To aid in the separation of the solids from the gases, the sleeve 12 in the outlet 11 may be varied in size and/or provided with vanes 40 (shown dotted) which will also aid in the swirling action in the upper portion or free board space 37 of the vessel 10 to promote separation of entrained solids about the peripheral area of vessel.

It is also sometimes desirable to extend the duct 12 downwardly into the vessel 10 to form an annular space 41 into which fuel and air may be injected through pipe 42 for the further addition of heat to the recirculated solids being delivered to the fluidized bed 33.

With the arrangement described, the gas velocity entering the fluidized bed can be of normal magnitude, as for example to give a space velocity of the order of 0.5 to 5 feet per second, while the velocity of the combustion gases discharging from the tube 14 may be considerably higher as for example 20 to 100 feet per second, without danger of elutriating the solids in the bed 33. The construction and unique arrangement permits higher rates of solid throughput per unit bed area as compared to the usual fluidized bed designs where gas velocities are necessarily limited by the fluidization characteristics of the particle-form material. This is due to the ability to pass a portion of the usual fluidizing gas flow around the fluidized bed.

Depending upon the material being treated in the fluidized bed the solids may consist of a mixture of the solid products being treated together with an inert solid material, or it may be formed either entirely of the solids being treated, or of just an inert solid material. For example, when treating limestone to form calcium oxide, or lime, the solid materials may be made up exclusively of the limestone feed. On the other hand, when processing other materials it may be desirable to mix the solid feed with a granular solid such as sand, or the like, which would be inert to the process, and is introduced for the purpose of becoming the heat carrier medium, being recirculated through the bed to provide the heat necessary for the reaction occurring within the fluidized bed.

It will be noted that passing a portion (which may be a major part) of the gas normally used for fluidization through the tube 14 permits use of a considerably smaller cross-sectional bed area and the retention time of the particle-form materials in the bed 33 may be optimized.

Figure 3:
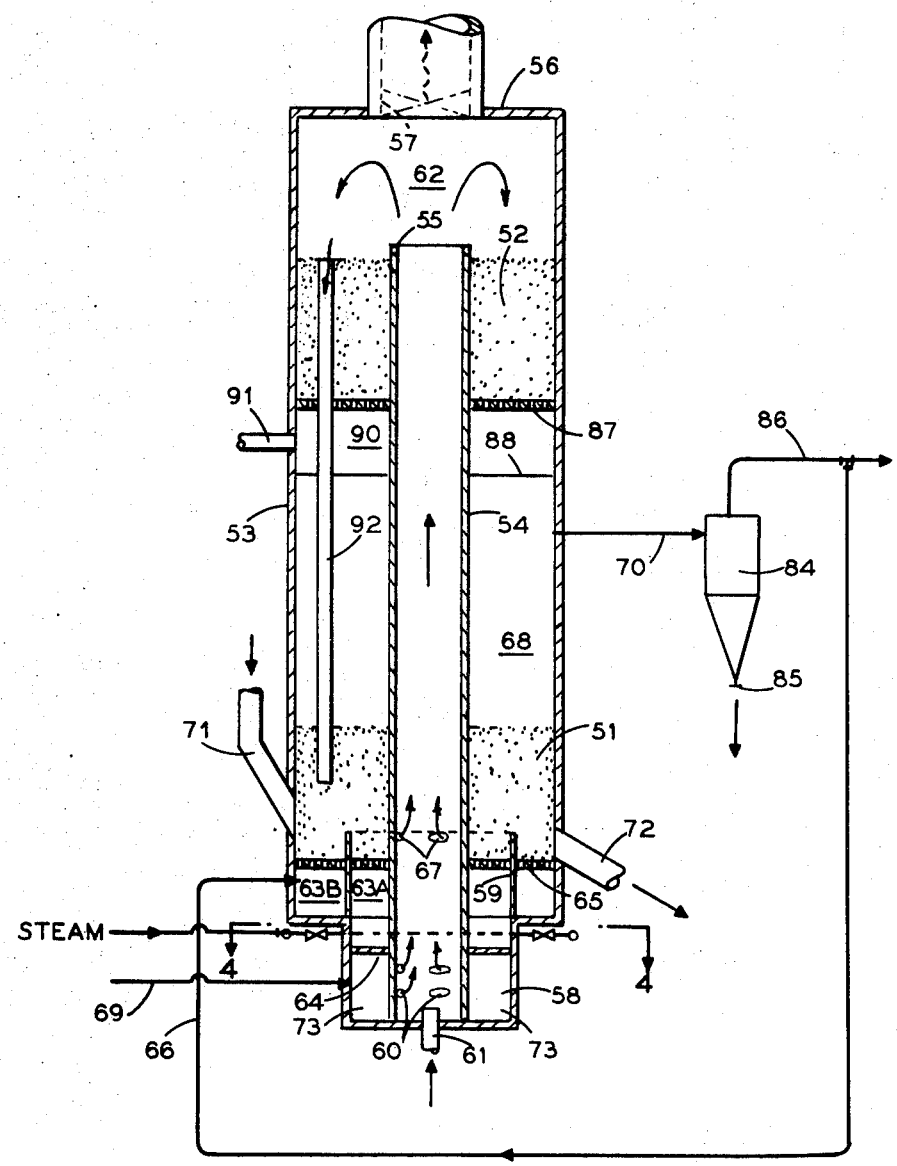
FIG. 3 is a diagrammatic elevation view partly in section of a modified form of fluidized bed constructed and arranged in accordance with the present invention.

The modification of the invention shown in FIG. 3 provides vertically spaced fluidized beds 51 and 52 confined in an upright vessel 53 with a central tube 54 extending upwardly through both beds, so that a reaction may occur in the lowermost bed 51 and the product therefrom be maintained separate from the combustion gases passing upwardly through the tube 54. This is particularly desirable when a substantially pure gaseous product is desired.

Figure 4:
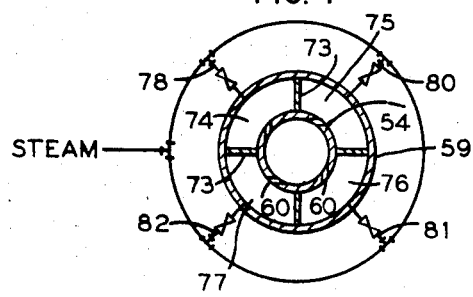
FIG. 4 is a section taken along the line 4—4 of FIG. 3.

As shown in FIGS. 3 and 4, the upwardly elongated pressure vessel 53 is of circular horizontal cross-sectional shape. The centrally disposed tube 54 extends upwardly beyond the upper fluidized bed 52 to a position 55 terminating some distance below the top 56 of the vessel and beneath the central gas outlet opening 57, similar to the FIG. 1 version. The tube 54 is provided at its lower end with a surrounding plenum chamber 58 for the tangential introduction of air through ports 60, the air initially entering plenum 58 via conduit 69. The fuel may be introduced axially of the central tube through a burner 61, or tangentially introduced, if desired, to mix with the combustion air and thereby create a burning mass of combustion products which spiral upwardly through the tube 54 to discharge into the freeboard space 62 in the upper portion of the vessel 53.

An annular plenum chamber 63 is positioned immediately above the chamber 58 and is separated therefrom by an annular solid plate 64. The roof of the chamber 63 is provided with a gas pervious structure 65 so that fluidizing gas delivered to the chamber 63 through pipe 66 is distributed circumferentially of the chamber and discharges upwardly through the structure 65 to fluidize the bed 51. As shown, an annular collar or cylindrical member 59 is positioned within the chamber 63 to separate the chamber into concentric annular outer and inner chamber portions 63B and 63A, respectively. The member 59 extends upwardly through and beyond the structure 65 to at least the level of a circumferential series of ports 67 formed in the wall of the tube 54. It is sealed to thereby form the inner annular chamber portion 63A. A separate fluidizing and sealing medium, such as steam, can then be delivered to the chamber 63A as indicated in FIGS. 3 and 4 to aid in fluidizing the bed 51, while at the same time substantially preventing flow of fluidizing medium from the bed 51 through the ports 67. This construction aids in maintaining the purity of any gaseous reactant product produced in the fluidized bed 51 as it is discharged upwardly through the freeboard space 68 and through the outlet pipe indicated at 70. Moreover, primarily only fluidized medium passed upwardly from chamber 63A will be entrained with the solids discharging through ports 67 into the combustion zone of the tube 54.

As hereinafter described, the incoming raw materials to be processed in the unit may be a solid which will enter through the conduit 71. The processed solids are discharged from the unit through the conduit 72 for downflow operation and conduit 85 for upflow operation. The conduits 71 and 72 will be provided with suitable devices (not shown), such as feeders, to regulate solids flow to and from the unit. Alternatively the raw feed material may be a liquid or a gas-suspended solid in which case suitably modified arrangements may be used for delivery of materials to the unit. For example, if the raw feed material is a liquid it may be injected into the bed 51 for processing or sprayed into the freeboard space 68 above the fluidized bed 51 for discharge downwardly toward the bed 51.

It is well known in the fluidized bed art that the velocity of flow through a fluidized bed is limited to a relatively narrow range. As shown in FIG. 4, the inner annular chamber portion 63A is divided by radial partitions 73 into four separate sections 74, 75, 76 and 77 with each part provided with a controllable source of sealing fluid including valved pipes 78, 80, 81 and 82, respectively. Using this arrangement, one or more of the sections 74—77 may be removed from service together with the section of bed 51 associated therewith with a consequent significant reduction or even elimination of solids flow through the corresponding discharge port or ports 67. Thus the rate of flow of solids through the vessel 53 can be regulated by manipulating the flow of fluidizing medium from inner chamber 63A.

As hereinafter described in greater detail with respect to a specific example of the operation of the device described, the fluids leaving the bed 51 and passing through the pipe 70 discharge into centrifugal separator 84 for removal of entrained solids. The separated solids may be passed to processing apparatus or to storage (not shown) through a pipe 85, while the gaseous fluids will discharge through pipe 86 to points of use or further processing (not shown). As illustrated, the gaseous fluid may be recycled in part through pipe 66 for use as the fluidizing medium delivered to the chamber 63, to maintain a high purity of the gaseous production in bed 51.

The fluidized bed 52 in the upper portion of the vessel 53 is provided with an annular perforated plate 87 which forms the lower boundary of the bed 52. An annular imperforate plate 88 is spaced downwardly from plate 87 to define a fluid-distributing chamber 90 which is supplied with a fluidizing medium through a conduit 91. The overflow of solids from bed 52 passes downwardly through conduit or duct 92 into the fluidized bed 51.

In the operation of the modification shown in FIGS. 3 and 4 particle-form solid material may be delivered to the bed 51 through the inlet duct 71. The material may, for example, be crushed limestone ($CaCO_3$) with or without an inert solid such as sand. The bed is fluidized by a fluidizing medium which may be the product gas, as hereinafter discussed. With combustion established in the lower portion of the tube 54, combustion gases will spiral upwardly through the tube entraining particle-form material added thereto through the ports 67 from the fluidized bed 51.

The gases discharging from the upper end of the tube 54, with the entrained solids, will have a high component of tangential movement, so that upon discharge the solids will be projected outwardly into the freeboard space 62, and will separate from the conveying gas, dropping by gravity onto the bed 52. The passage of the hot gas and entrained solids through the tube 54 will heat the particle-form materials. If necessary additional heat may be added in the bed 52 as disclosed in the FIG. 1 version of the invention.

With the heated particle-form passed downwardly from the bed 52 to bed 51 by the overflow duct 92, the necessary heat for conversion of the $CaCO_3$ to $CaO+CO_2$ can be attained in the bed 51. The effluent gases from the bed, with any fine, entrained solids will be passed through pipe 70 and centrifugal separator 84 with the fines discharged through pipe 85 to storage or for use. To maintain a high $CO_2$ purity in the discharge from the separator, it has been found desirable to utilize the gaseous product as the fluidizing medium in the bed 51. Thus, the requisite portion of the $CO_2$ gas is conveyed by pipe 66 for introduction into plenum 63.

When the steam fluidizing-sealing medium as already described is utilized, the steam discharged from the bed 51 with the $CO_2$ can easily be separated from the $CO_2$ by condensation and the high purity $CO_2$ product will not be contaminated by gaseous combustion products since these will be separately discharged from the apparatus through the duct 57.

We claim:

1. In fluidized bed apparatus, the combination comprising:
   A. Walls forming an upright vessel having an upper outlet;
   B. a substantially unobstructed upright tube within said vessel and having its upper end opening into the upper portion of said vessel;
   C. means for introducing combustion constitutes into the lower end portion of said tube to effect combustion within said tube with the products of combustion spiraling upwardly through said tube;
   D. means forming an annular fluidized bed of particle-form material intermediate the height of said tube between said tube and the wall of said vessel;
   E. means including tangentially arranged openings in the tube wall interconnecting said fluidized bed and the interior of said tube for movement of particle-form material from said fluidized bed into the products of combustion spiraling upwardly through said tube; and
   F. means for separating the particle-form material from the gaseous products of combustion in the upper portion of said vessel with the gases passing through said upper outlet and said particle-form material deposited into said fluidized bed.

2. The combination of claim 1 wherein said tube is of circular cross section and positioned with its longitudinal axis coinciding with the upright axis of said upright vessel.

3. The combination of claim 2 wherein a plurality of annular fluidized beds are vertically spaced within said vessels in surrounding relation to said tube, a lower of said fluidized beds is interconnected with said tube, and an upwardly adjacent bed is connected with a lower adjacent bed by an upright gravity flow tube for movement of particle-form material downwardly therethrough.

4. The combination of claim 3 wherein direct means provide flow of the gaseous product of thermal reaction in said lowermost fluidized bed through said bed for fluidization of the particle-form material therein.

5. The combination of claim 4 wherein annular collar means are spaced from and encircle the means interconnecting a lower fluidized bed with said tube, and means provide a selective flow of inert gas into the space between said collar and said tube.

6. The combination according to claim 1 wherein means are provided for controlled delivery of reactant material into said fluidized bed.

7. The combination according to claim 1 wherein said particle-form material includes an inert granular solid.

8. The combination according to claim 6 wherein means provides for the controlled withdrawal of particle-form solids from said vessel.

9. The combination according to claim 1 wherein said annular fluidized bed is sized for preferred retention time of particle-form materials therein.